(12) United States Patent
Williams et al.

(10) Patent No.: US 8,502,488 B2
(45) Date of Patent: Aug. 6, 2013

(54) POSITION SENSORLESS MOTOR CONTROL

(75) Inventors: Connel Brett Williams, Leamington Spa (GB); Christopher David Dixon, Coventry (GB); Jeffery Ronald Coles, Solihull (GB); Robert James Huxford, Solihull (GB)

(73) Assignee: TRW Automotive US LLC, Livonia, MI (US)

( * ) Notice: Subject to any disclaimer, the term of this patent is extended or adjusted under 35 U.S.C. 154(b) by 126 days.

(21) Appl. No.: 12/990,996

(22) PCT Filed: May 8, 2009

(86) PCT No.: PCT/IB2009/051914
§ 371 (c)(1),
(2), (4) Date: Nov. 16, 2010

(87) PCT Pub. No.: WO2009/136381
PCT Pub. Date: Nov. 12, 2009

(65) Prior Publication Data
US 2011/0057593 A1    Mar. 10, 2011

(30) Foreign Application Priority Data
May 8, 2008    (GB) .................................. 0808342.0

(51) Int. Cl.
*H02P 6/02* (2006.01)
*H02P 6/16* (2006.01)
*H02P 6/18* (2006.01)

(52) U.S. Cl.
USPC .............. 318/400.32; 318/400.26; 318/254.1; 318/138

(58) Field of Classification Search
USPC ............. 318/400.02, 400.05, 400.07, 400.11, 318/400.26, 400.32, 400.37, 254, 432, 254.1, 318/138
See application file for complete search history.

(56) References Cited

U.S. PATENT DOCUMENTS

| 4,641,066 | A | * | 2/1987 | Nagata et al. | ............ 318/400.37 |
| 5,272,429 | A | * | 12/1993 | Lipo et al. | .................... 318/808 |
| 5,834,911 | A | * | 11/1998 | Kimura | ................... 318/400.11 |
| 6,191,545 | B1 | * | 2/2001 | Kawabata et al. | ....... 318/400.01 |
| 6,337,548 | B2 | * | 1/2002 | Kawabata et al. | ....... 318/400.04 |
| 6,433,496 | B1 | * | 8/2002 | Kawagoshi | ............. 318/400.05 |
| 6,479,956 | B1 | * | 11/2002 | Kawabata et al. | ....... 318/400.12 |

(Continued)

FOREIGN PATENT DOCUMENTS

| JP | 7118945 B | 12/1995 |
| JP | 10252269 A | 9/1998 |
| JP | 2003199382 A | 7/2003 |
| KR | 19990077880 A | 10/1999 |

*Primary Examiner* — Paul Ip
(74) *Attorney, Agent, or Firm* — MacMillan, Sobanski & Todd, LLC

(57) ABSTRACT

A control system is provided for an AC electric motor which comprises a rotor and a stator and a plurality of phase windings connected in a star formation, each winding having one end connected to a common neutral point and another end arranged to have a terminal voltage applied to it. The control system comprises switching means arranged to control the terminal voltages applied to the windings and control means arranged to control the switching means so as to switch it between a plurality of states in each of a sequence of PWM periods. The control means is further arranged to measure the voltage at the neutral point at sample times within the PWM periods and to generate from the measured voltages an estimation of the rotational position of the rotor.

12 Claims, 5 Drawing Sheets

U.S. PATENT DOCUMENTS

| | | | |
|---|---|---|---|
| 6,512,341 B2 * | 1/2003 | Matsushiro et al. | 318/400.07 |
| 6,879,129 B2 * | 4/2005 | Tazawa et al. | 318/727 |
| 7,102,903 B2 * | 9/2006 | Nakamura et al. | 363/98 |
| 7,298,106 B2 * | 11/2007 | Yamamoto et al. | 318/400.27 |
| 7,298,109 B2 * | 11/2007 | Sakamaki et al. | 318/489 |
| 7,466,093 B2 * | 12/2008 | Otaguro | 318/400.09 |
| 7,531,976 B2 * | 5/2009 | Fukamizu et al. | 318/400.34 |
| 7,535,188 B2 * | 5/2009 | Fukamizu et al. | 318/254.1 |
| 7,667,419 B2 * | 2/2010 | Fukamizu et al. | 318/400.34 |
| 7,768,226 B2 * | 8/2010 | Fukamizu et al. | 318/700 |
| 7,986,117 B2 * | 7/2011 | Yamamoto et al. | 318/400.26 |
| 8,212,504 B2 * | 7/2012 | Ogahara | 318/400.13 |
| 2001/0004197 A1 * | 6/2001 | Kawabata et al. | 318/811 |
| 2002/0030462 A1 * | 3/2002 | Matsushiro et al. | 318/727 |
| 2002/0140395 A1 * | 10/2002 | Tazawa et al. | 318/727 |
| 2003/0067278 A1 * | 4/2003 | Nakamura et al. | 318/254 |
| 2006/0273247 A1 * | 12/2006 | Sakamaki et al. | 250/231.13 |
| 2007/0018599 A1 * | 1/2007 | Yamamoto et al. | 318/439 |
| 2007/0194730 A1 * | 8/2007 | Fukamizu et al. | 318/254 |
| 2007/0194731 A1 * | 8/2007 | Fukamizu et al. | 318/254 |
| 2007/0216325 A1 * | 9/2007 | Fukamizu et al. | 318/254 |
| 2007/0229004 A1 * | 10/2007 | Fukamizu et al. | 318/254 |
| 2008/0018279 A1 * | 1/2008 | Fukamizu et al. | 318/432 |
| 2008/0218107 A1 * | 9/2008 | Otaguro | 318/400.05 |
| 2009/0237022 A1 * | 9/2009 | Yamamoto et al. | 318/400.26 |
| 2010/0066284 A1 * | 3/2010 | Iwaji et al. | 318/400.02 |
| 2010/0237809 A1 * | 9/2010 | Ogahara | 318/400.13 |
| 2010/0320945 A1 * | 12/2010 | Taniguchi et al. | 318/400.02 |
| 2011/0031922 A1 * | 2/2011 | Sakai et al. | 318/519 |

* cited by examiner ional Appli-
POSITION SENSORLESS MOTOR CONTROL

CROSS-REFERENCE TO RELATED APPLICATIONS

This application is a national stage of International Application No. PCT/IB2009/051914 filed May 8, 2009, the disclosures of which are incorporate d herein by reference, and which claimed priority to Great Britain Patent Application No. 0808342.0 filed May 8, 2008, the disclosures of which are incorporated herein by reference.

BACKGROUND OF THE INVENTION

The present invention relates to the control of electrical machines. The invention is primarily targeted at salient permanent magnet sinusoidal motors (PMSMs) with low per-unit mutual inductance. However, it is applicable to any type of sinusoidal machine (including induction motors and synchronous reluctance motors) that have self and mutual inductances that vary with rotor position.

Various methods are known for determining the rotational position of an electrical machine without using a dedicated position sensor. These are known as sensorless techniques. Many known methods use current sensors arranged to measure the current in the coils of the machine together with algorithms that can determine the position of the motor from the current measurements. Examples of such systems are described, for example in WO2004/023639A and WO2006/037966.

The present invention provides a control system for an AC electric machine, such as a motor, which comprises a rotor and a stator and a plurality of phase windings connected in a star formation, each winding having one end connected to a common neutral point and another end arranged to have a terminal voltage applied to it. The control system comprises switching means which may be arranged to control the terminal voltages applied to the windings, and control means, which may be arranged to control the switching means, for example so as to switch it between a plurality of states in each of a sequence of PWM periods. The control means may be further arranged to measure the voltage at the neutral point at sample times, which may for example be within the PWM periods, and to generate from the measured voltages an estimation of the rotational position of the rotor.

The neutral point voltage may include a component that varies with the inductance of the windings, and therefore with the position of the rotor. It may also include other components, such as a DC component and harmonics. In some cases, for example where this component that varies with position is small, the control means may be arranged to perform one or more steps to extract this component from the measured neutral point voltage and use this extracted component of the measured voltage to estimate the motor position.

The control means may be further arranged to measure a DC link voltage and to further use the DC link measurement to generate the position estimation.

The control means may be arranged to measure the neutral point voltage when all of the phases are connected to the DC link voltage thereby by to generate an estimation of the DC link voltage, and to use that estimation to generate the position estimation.

The control means may be arranged to compare the measured DC link voltage with the estimated DC link voltage and if they fail to meet a consistency condition, to generate a fault indication.

The sample times may be within the PWM periods. However in some cases they may be outside the normal torque-generating PWM periods during times when voltages are applied to the windings specifically for the purpose of position estimation.

The control means may be arranged to measure the neutral point voltage during two complementary states within one PWM period, during two pairs of two complementary states within one PWM period, or during each of a number of non-complementary states equal to the number of phases of the motor, within one PWM period. Where the machine is a three-phase machine this will be three active states.

The control means may be arranged to define a minimum state time for neutral point voltage measurement and a minimum number of active states within a PWM period in which the neutral point voltage needs to be measured. It may be arranged to determine a demanded net voltage for the PWM period, and to control the switching means so as to provide at least the minimum number of active states, each for at least the minimum state time. It may also be arranged to control the switching pattern so as to provide the demanded net voltage.

The present invention further provides a method of sensing the position of a sinusoidal machine comprising measuring a neutral-point voltage in at least two inverter states and determining motor position from the measured voltages.

The present invention is best suited to motors with low per-unit mutual inductance, but may also be suitable for motors with higher mutual inductance. It is therefore particularly well suited for motors with concentrated windings as these tend to have lower mutual inductance than distributed windings. It is equally applicable to systems with a single current sensor in the DC link and with multiple phase current sensors. It is suitable for any drive application but is particularly attractive for sensorless electric drive applications where low acoustic noise is required. Some embodiments are in particular suitable for use with PWM injection sensorless control.

The original target application for the present invention is a salient PMSM with concentrated windings and low per-unit mutual inductance with a single current-sensor drive for an automotive application.

Some embodiments of the present invention differ from other techniques that attempt to derive the electrical position from the neutral point voltage in that the resolution is far greater, resolving position down to levels associated with carrier frequency injection techniques, and is only limited by the resolution of the measurement hardware.

An example of an existing technique which uses the neutral point voltage is the ELMOS VirtuHall product which produces an electrical position signal with a resolution of 30° (electrical).

The present invention further provides a control system for an AC electric motor which comprises a rotor and a stator and a plurality of phase windings connected in a star formation, each winding having one end connected to a common neutral point and another end arranged to have a terminal voltage applied to it, the control system comprising switching means arranged to control the terminal voltages applied to the windings and control means arranged to control the switching means so as to switch it between a plurality of states in each of a sequence of PWM periods, wherein the control means is further arranged to measure the voltage at the neutral point when all of the phases are connected to the DC link voltage thereby by to generate an estimation of the DC link voltage.

The control means may be further arranged to compare a measured DC link voltage with the estimated DC link voltage and if they fail to meet a consistency condition, to generate a fault indication.

Other advantages of this invention will become apparent to those skilled in the art from the following detailed description of the preferred embodiments, when read in light of the accompanying drawings.

DETAILED DESCRIPTION OF THE INVENTION

Figure 1:
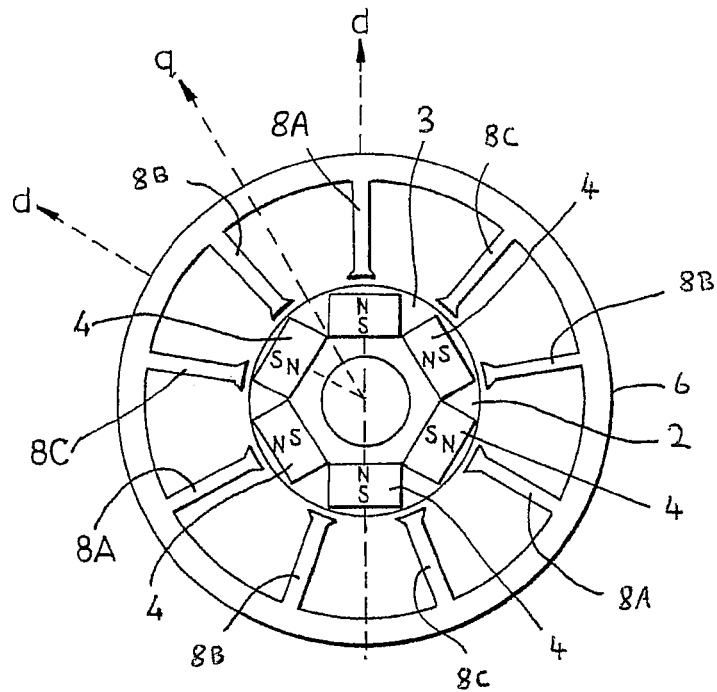
FIG. 1 is a diagram of a salient PM electric motor.

Referring to FIG. 1, a three phase electrically commutated sinusoidal AC brushless permanent magnet synchronous motor comprises a rotor 2 having, for example, six magnets 4 mounted on it, which in this instance are arranged so as to provide six poles which alternate between north and south around the rotor 2. The rotor 2 therefore defines three direct or d axes evenly spaced around the rotor and three quadrature or q axes interspaced between the d axes. A stator 6 in this embodiment comprises a nine slot copper wound element having three groups 8A, 8B, 8C of three teeth, each group of teeth having a common winding forming a respective phase. There are therefore three electrical cycles in each full rotation of the rotor, and the three teeth in any phase 8A, 8B, 8c are always in the same electrical position as each other. The number of poles and slots of the machine will vary depending on the application, and can affect its suitability for use with the present invention as will be described in more detail below.

Figure 2:
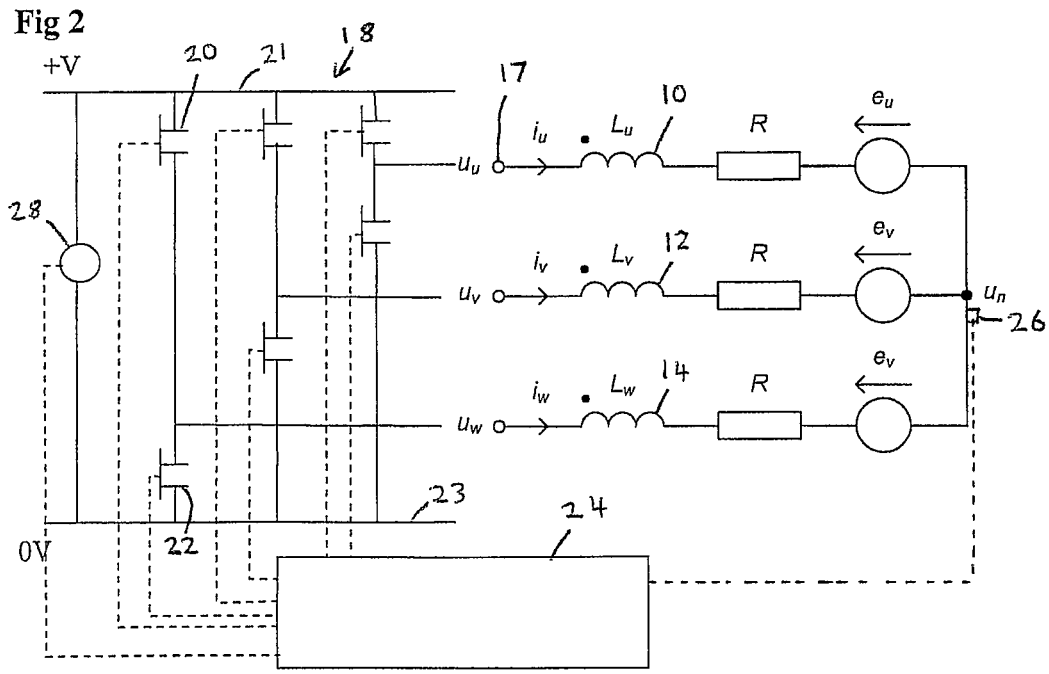
FIG. 2 is a schematic diagram of a three phase electrical model of the motor of FIG. 1 and associated control system.

Referring to FIG. 2 the three stator windings 10, 12, 14 are associated with the three phases U, V and W of the motor. The windings 10, 12, 14 are connected together in a star formation, each having one end connected to a common neutral point 16 and a terminal 17 at the other end connected to a drive circuit 18. Each winding has an inductance $L_u$, $L_v$, $L_w$ associated with it, a resistance R associated with it, a current $i_u$, $i_v$, $i_w$ flowing through it, and a back EMF $e_u$, $e_v$, $e_w$ generated in it, at any one time. The terminal voltage applied to each of the windings by the drive circuit 18 at any time is referred to as $u_u$ $u_v$, $u_w$ respectively. The drive circuit 18 is arranged to connect each of the windings 10, 12, 14 independently to either one of two voltage inputs, in this case either a positive DC voltage +V or ground or 0V. To achieve this each winding 10, 12, 14 is connected via a top transistor 20 to a top rail 21 which is connected to the positive DC input +V from a DC power supply, and via a bottom transistor 22 to a bottom rail 23 which is connected to the negative terminal of the DC supply, which is at ground. The transistors 20, 22 are controlled by a controller 24 which is arranged to control the transistors 20, 22 to switch the motor between six active states and two inactive states. These states are referred to as inverter states as the drive circuit is often referred to as an inverter. Conventionally the active states are numbered 1 to 6, one of the inactive states when all windings 10, 12, 14 are connected to earth is referred to as 0 and the other inactive state when all of the windings are connected to +V is referred to as 7. In this application each of the active states is referred to by the letter of the winding which is connected to a different voltage to the other two, and by the sign of the voltage to which that winding is connected. So for example the state where phase U is connected to +V and V and W to 0V is referred to as +U, and the state where phase V is connected to 0V and phases U and W are connected to +V is referred to as state −V. A full list of the active states is provided in the table below.

| State name | U terminal voltage | V terminal voltage | W terminal voltage |
|---|---|---|---|
| +U | +V | 0V | 0V |
| −U | 0V | +V | +V |
| +V | 0V | +V | 0V |
| −V | +V | 0V | +V |
| +W | 0V | 0V | +V |
| −W | +V | +V | 0V |

A voltage sensor 26 is arranged to measure the voltage at the neutral point 16 and provide a voltage signal as an input to the controller 24 which varies with that neutral point voltage. Also voltage sensor 26 is connected in a DC link between the two rails 21, 23 to measure the voltage of the top rail 21 relative to the bottom rail 23, and hence the total voltage applied across the drive circuit 18. The controller 24 also receives an input indicative of the drive that is required from the motor, for example in the form of a current demand, or a torque demand. The controller 24 is arranged to control the drive circuit using pulse width modulated PWM control in which, for each of a series of PWM periods of equal length, the net voltage required is determined, and then the combination of states and their duration required to produce the required net voltage are calculated and applied to the windings.

In a star-point connected motor such as that of FIG. 1, the three phase currents must sum to zero:

$$i_u + i_v + i_w = 0 \quad (1)$$

Furthermore, for a motor with perfect sinusoidal three-phase rotor back-EMFs, the sum of the rotor back-EMFs is also zero:

$$e_u + e_v + e_w = 0 \quad (2)$$

From FIG. 1 it can be seen that the voltage drop from the terminal voltage of each phase ($u_u$, $u_v$, $u_w$) to the neutral (star) point voltage ($u_n$) is:

$$u_u - L_{uu}\frac{di_u}{dt} - M_{uv}\frac{di_v}{dt} - M_{uw}\frac{di_w}{dt} - i_u R - e_u = u_n$$

$$u_v - M_{vu}\frac{di_u}{dt} - L_{vv}\frac{di_v}{dt} - M_{vw}\frac{di_w}{dt} - i_v R - e_v = u_n \quad \text{(3a), (3b), (3c)}$$

$$u_w - M_{wu}\frac{di_u}{dt} - M_{wv}\frac{di_v}{dt} - L_{ww}\frac{di_w}{dt} - i_w R - e_w = u_n$$

Where L represents self-inductance and M represents mutual inductance such that $L_{uu}$, $L_{vv}$ and $L_{ww}$ are the self inductances of phases u, v and w respectively; $M_{uv}$ is the mutual inductance between phase u, phase v and so on. (Note that the coupling from phase u to v is the same as from phase v to u, i.e. $M_{uv}=M_{vu}$.)

Summing equations (3a), (3b) and (3c) and substituting equations (1) and (2) to eliminate the ohmic and rotor back-EMF voltage drops, the neutral point voltage is then:

$$u_n = \frac{1}{3}\left[u_u + u_v + u_w - (L_{uu} + M_{uv} + M_{uw})\frac{di_u}{dt} - (M_{uv} + L_{vv} + M_{vw})\frac{di_v}{dt} - (M_{uw} + M_{vw} + L_{ww})\frac{di_w}{dt}\right] \quad (4)$$

In general for an ideal non-salient motor with three-phase sinusoidally distributed windings the mutual inductance is minus half the self-inductance, that is:

$$M = -\frac{1}{2}L \quad (5)$$

In which case the mutual and self-inductances in equation (4) sum up to zero and the neutral point voltage simplifies to:

$$u_n = \frac{1}{3}[u_u + u_v + u_w] \quad (6)$$

In reality mutual inductance is always slightly less than 50% of the self inductance due to practical effects such as flux leakage, although for most conditions the ideal conditions stated above can be assumed.

However, for motors with concentrated windings it is possible to achieve mutual inductances significantly lower than 50% of that self inductance. For example, for some motors it is possible to design a salient PMSM with a mutual inductance that is less than 10% of the self-inductance, such as a 12 slot 10 pole motor. In which case the mutual inductance terms can be eliminated and equation (4) approximates to:

$$u_n \approx \frac{1}{3}\left[u_u + u_v + u_w - L_{uu}\frac{di_u}{dt} - L_{vv}\frac{di_v}{dt} - L_{ww}\frac{di_w}{dt}\right] \quad (7)$$

Hence with low mutual inductance motors extra terms appear in the neutral point voltage that depend on the incremental inductance of the motor phases. Assuming an unsaturated salient motor with sinusoidal inductance distribution, these inductances will be of the form:

$$\begin{pmatrix} L_{uu} \\ L_{vv} \\ L_{ww} \end{pmatrix} = \begin{pmatrix} \bar{L} - \tilde{L}\cos(2\theta_e) \\ \bar{L} - \tilde{L}\cos\left(2\theta_e - \frac{4\pi}{3}\right) \\ \bar{L} - \tilde{L}\cos\left(2\theta_e - \frac{8\pi}{3}\right) \end{pmatrix} \quad (8)$$

Where for a PMSM $$\bar{L} = \frac{1}{2}(L_q + L_d) \quad (9a), (9b)$$

$$\tilde{L} = \frac{1}{2}(L_q - L_d)$$

Where $L_d$ is the direct-axis inductance and $L_q$ is the quadrature-axis inductance. In a salient PMSM $L_q > L_d$.

Combining equations (7) and (8) and eliminating the mean component of the inductances using equation (1), it can be seen that the neutral point voltage contains position-dependent information that could be used for sensorless control:

$$u_n = \frac{1}{3}\left[u_u + u_v + u_w - \tilde{L}\left(\cos(2\theta_e)\frac{di_u}{dt} + \cos\left(2\theta_e - \frac{4\pi}{3}\right)\frac{di_v}{dt} + \cos\left(2\theta_e - \frac{8\pi}{3}\right)\frac{di_w}{dt}\right)\right] \quad (10)$$

This position dependent component of the neutral point voltage will be relatively large for motors with low mutual inductance. For motors with high mutual inductance it is still present, but is relatively small, and may need to be extracted from the total signal and amplified if it is to be used for position sensing.

Techniques for Deriving Motor Position from Neutral-Point Voltage

The neutral point voltage can be sampled in specific inverter states to obtain motor position information from a salient PMSM with low mutual inductance.

The neutral point voltage in equation (10) contains position-dependent components that are proportional to the rate of change of current in the motor windings. The rate of change of current for each winding will in turn depend on the inverter state.

Full closed-form analysis of this effect is not straightforward because of the complexity of the interactions caused by the position-dependent nature of the inductances. However, a good understanding of the behaviour can be gained by considering the rate of change of current in a non-salient motor with inductance equal to the mean phase inductance, $\bar{L}$. This gives an approximation to the behaviour of the rates of change of current that is sufficient to gain an understanding of the sensorless technique. Numerical simulation that does not make use of these simplifying assumptions shows that this approximation is sufficient.

These rates of change of current in a non-salient machine are given by:

$$\frac{d}{dt}\begin{pmatrix} i_u \\ i_v \\ i_w \end{pmatrix} \approx \begin{pmatrix} -R/\bar{L} & 0 & 0 \\ 0 & -R/\bar{L} & 0 \\ 0 & 0 & -R/\bar{L} \end{pmatrix}\begin{pmatrix} i_u \\ i_v \\ i_w \end{pmatrix} + \begin{pmatrix} -1/\bar{L} & 0 & 0 \\ 0 & -1/\bar{L} & 0 \\ 0 & 0 & -1/\bar{L} \end{pmatrix}\begin{pmatrix} e_u \\ e_v \\ e_w \end{pmatrix} + \frac{1}{3\bar{L}}\begin{pmatrix} 2 & -1 & -1 \\ -1 & 2 & -1 \\ -1 & -1 & 2 \end{pmatrix}\begin{pmatrix} u_u \\ u_v \\ u_w \end{pmatrix} \quad (11)$$

During inverter state +U, where phase U is high and phase V and W are low, the terminal voltages of the motor are $u_u = u_{DC}$ and $u_v = u_w = 0$, where $u_{DC}$ is the DC link voltage. The rate of change of current for each phase in inverter state +U is approximately:

$$\frac{di_u}{dt}\bigg|_{+U} \approx \frac{-R}{L}i_u - \frac{1}{L}e_u + \frac{2}{3L}U_{DC} \quad (12a)\text{-}(12c)$$

$$\frac{di_v}{dt}\bigg|_{+U} \approx \frac{-R}{L}i_v - \frac{1}{L}e_v - \frac{1}{3L}U_{DC}$$

$$\frac{di_w}{dt}\bigg|_{+U} \approx \frac{-R}{L}i_w - \frac{1}{L}e_w - \frac{1}{3L}U_{DC}$$

Likewise, the rates of change of current during the −U inverter state are:

$$\frac{di_u}{dt}\bigg|_{-U} \approx \frac{-R}{L}i_u - \frac{1}{L}e_u - \frac{2}{3L}U_{DC} \quad (13a)\text{-}(13c)$$

$$\frac{di_v}{dt}\bigg|_{-U} \approx \frac{-R}{L}i_v - \frac{1}{L}e_v + \frac{1}{3L}U_{DC}$$

$$\frac{di_w}{dt}\bigg|_{-U} \approx \frac{-R}{L}i_w - \frac{1}{L}e_w + \frac{1}{3L}U_{DC}$$

It can be seen that these terms are dependent on speed (rotor back-EMF magnitude) and load (phase current magnitude). For optimum sensorless position estimation these speed and load terms need to be removed. This can be achieved either by applying model-based corrections in real-time or by eliminating them by combining more than one measurement. For ease of analysis the zero speed/zero current condition can be considered because this removes the terms based on current i and EMF e from the analysis. For the specific inverter state +U equations 12a to 12c can be substituted into equation (10) and the neutral point voltage can be shown to be:

$$u_n|_{+U} = \frac{U_{DC}}{3}\left[1 - \frac{\tilde{L}}{L}\cos(2\theta_e)\right] \quad (14)$$

Similarly for the −U state the neutral point voltage can be approximated by substituting equations 13a to 13c into equation 10 to give:

$$u_n|_{-U} = \frac{U_{DC}}{3}\left[2 + \frac{\tilde{L}}{L}\cos(2\theta_e)\right] \quad (15)$$

This approach can be extended to the remaining phases V and W.

For conditions where the motor speed and current are not zero the electrical position information is still present, it is just that additional terms are present which introduce additional harmonics. These additional harmonics can be removed by the use of feedforward compensation terms, a technique that is common practice and well known to the skilled man.

For motors where the mutual inductance is approaching 50%, for example a 9 slot 6 pole motor, it is possible to boost the differential part of the neutral point voltage which gives the position information, by removing the DC component of the signal. Even though the variation due to position is very small the amplification and subsequent filtering of the position-dependent component of the neutral point voltage signal is enough to obtain the electrical position.

PWM Modulation Strategies that Facilitate Sensorless Position Estimation

Equations 14 and 15 show how rotor position information may be obtained by sampling the neutral-point voltage during different inverter states.

One way to create the required inverter states would be to interrupt the PWM sequence and inject known inverter states for one or more PWM periods in order to allow the required measurements to be taken. This is equivalent to the basic INFORM technique, except that the INFORM technique measures rate of change of current rather than neutral point voltage (and optionally the DC link voltage) during the applied inverter states. The major disadvantage of the INFORM-style approach is that interrupting the PWM pattern for one or more PWM periods usually results in sub-harmonics of the switching pattern that lead to considerable levels of acoustic noise.

A preferable approach is to measure the neutral point voltage within the inverter states within a normal PWM period. This can be achieved without reducing the effective switching frequency of the transistors, and so therefore results in little or no extra acoustic noise which is a major benefit for numerous applications. This makes it possible to achieve silent low-speed sensorless control. There are many different PWM modulation strategies that would facilitate such an approach. Some examples of these are described below. This technique is similar in this respect to the low-acoustic noise low-speed sensorless control described in WO2004/023639A, except that the technique described in that document measures the rate of change of phase current (di/dt) during particular inverter states, whereas some embodiments of the present invention take measurements of the neutral-point voltage (and optionally the DC link voltage) during particular inverter states.

Sampling $U_n$ in Four Inverter States

The electrical motor position $\theta_e$ may be fully determined by combining measurement of the DC link voltage (UDC) with measurements of the neutral point voltage ($u_n$) taken during two pairs of complementary non-zero inverter states. Here two states are referred to as complementary when the phase voltages are reversed between them, such as +U and −U. Using equations 14 and 15 it can be shown that:

$$u_n(+U) - u_n(-U) \approx \frac{U_{DC}}{3}\left[-1 - \frac{2\tilde{L}}{L}\cos(2\theta_e)\right] \quad (16a),\,(16c)$$

$$u_n(+W) - u_n(-W) \approx \frac{U_{DC}}{3}\left[-1 - \frac{2\tilde{L}}{L}\cos\left(2\theta_e - \frac{8\pi}{3}\right)\right]$$

There are two equations and seven independent variables. By measuring $u_n(+U)$, $u_n(-U)$, $u_n(+W)$, $u_n(-W)$ and $U_{DC}$ five of the variables are known and the two equations may be rearranged to yield $2\theta_e$.

A convenient method for making this calculation is as follows:

$$u_{nU} = u_n(+U) - u_n(-U) + \frac{U_{DC}}{3} \quad (17a)\text{-}(17d)$$

$$u_{nW} = u_n(+W) - u_n(-W) + \frac{U_{DC}}{3}$$

$$u_{nV} = -u_{nU} - u_{nW}$$

$$2\hat{\theta} = -\arg\left\{u_{nU} + u_{nV}e^{j\frac{2\pi}{3}} + u_{nW}e^{j\frac{4\pi}{3}}\right\} + \pi$$

Where $\hat{\theta}$ is the position estimate and 'arg' is the argument or angle of a complex number.

Figure 3:
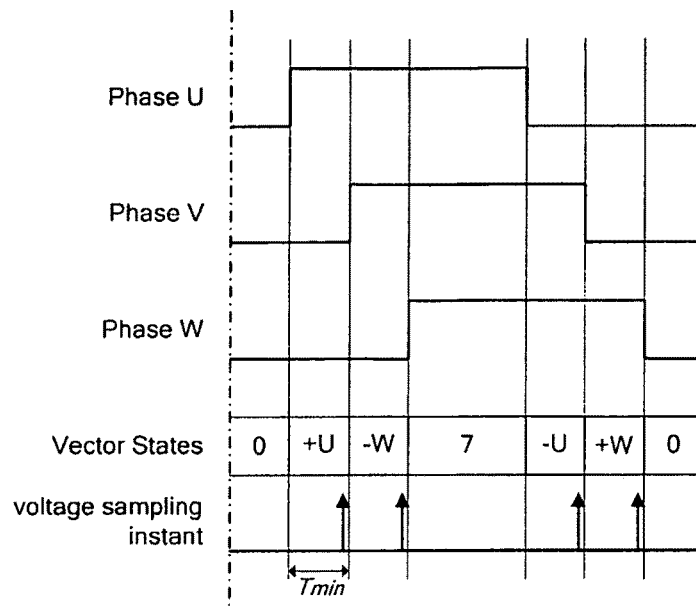
FIG. 3 is a diagram of a typical PWM pattern in the system of FIG. 2 that enables the neutral point voltage to be measured in four non-zero inverter states.

Conventional centre-aligned PWM techniques produce a maximum of two non-zero inverter states within a single PWM period, and are therefore not suitable for use with this technique. However, the required inverter states can be achieved by judicious shifting of the PWM patterns as shown in FIG. 3. It will be appreciated that a certain minimum time is required at each inverter state transition to allow time for the neutral point voltage measurement to settle and then to be sampled. This time is designated $T_{min}$ and depends on transient factors such as stray capacitance, electromagnetic pickup on signals, signal conditioning etc.

PWM Pattern Realisation for Four Inverter States

FIG. 3 shows an example of a PWM pattern that produces four active states in one PWM period. The terminal voltages of the three phases U, V and W over the period are shown, with the resulting states indicated for each part of the PWM period, and the times at which the neutral point voltage is sampled are also shown. In this example the total modulation index demand, i.e. the net voltage during the PWM period, is zero (which in this case is achieved by commanding a 50% duty cycle in each phase) but by shifting the PWM patterns from their original centre-aligned configuration the four required inverter states are produced at different points within the PWM period. Note that in this case the PWM edges are biased around the centre of the PWM waveform, but they could just as easily be biased to the start of the waveform (e.g. with phase U going high at the start of the PWM period) without changing the underlying principle.

Note, the states which are normally represented as numbers 1-6 are represented instead with letters and signs described above that show which phase they affect.

Figure 4:
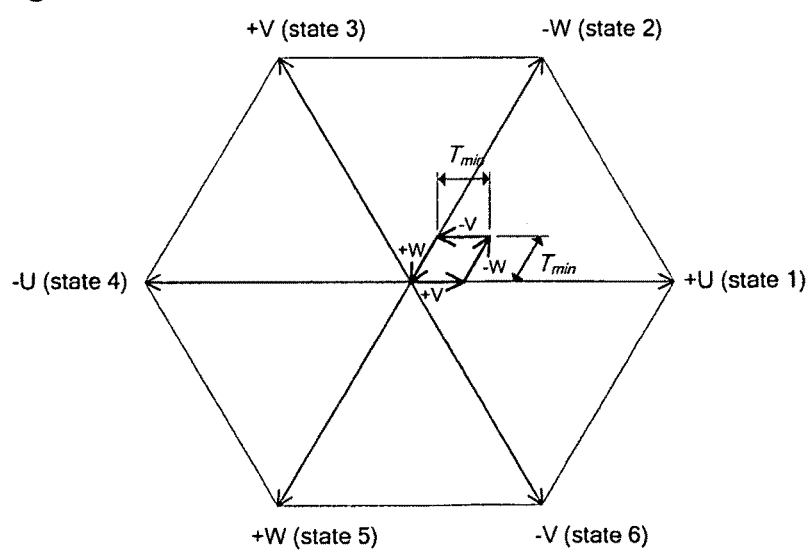
FIG. 4 is a space vector diagram for the PWM pattern shown in FIG. 3.

As with most low-speed sensorless techniques, the shifting of the patterns results in a reduction in the maximum realisable voltage. This is demonstrated in terms of space vectors in FIG. 4, in which the same nomenclature is used to define the different states.

The resulting maximum modulation index (defined in terms of the ratio of peak phase voltage to half the DC link voltage) for the case where the minimum time required in each inverter state to measure the neutral point voltage is $T_{min}$, is $$M_{max} = \frac{2}{\sqrt{3}}\left(1 - \frac{4T_{min}}{T_{PWM}}\right) \quad (18)$$

where TPWM is the PWM period. For a typical example where TPWM=50 μs and $T_{min}$=3 μs, this results in a maximum modulation index of 1.01. Since this technique is only used at low speeds where full modulation index is not required, this should be acceptable.

One advantage of the neutral-voltage sensing technique over di/dt sensing techniques such as that descried in WO 2004/023639 A1 is that less time is required for the signal to settle, which means that $T_{min}$ will be smaller and a higher maximum modulation index may be achieved.

In certain applications where single current sensing is used it may be necessary to have a larger minimum inverter state time for two of the inverter states (e.g. +V & −W) to allow time for current measurements to be taken for standard current control. In this case equation (19) would have to be modified accordingly.

DC Link Voltage Measurement

The above embodiment requires a measurement of the DC link voltage as part of the position calculation. This can be determined in a number of ways. One method is to filter the DC link voltage in the analogue domain with a filter time-constant that is significantly (e.g. many times) longer than the PWM period. This enables the link voltage to be sampled at any point in the PWM period. Alternatively an unfiltered DC link voltage (or a filtered version of the link voltage with a very low filter time constant) can be sampled during each if the inverter states. The latter technique may be necessary in systems where the DC link resistance is relatively high, causing the link voltage at the sample point to vary with phase current.

Both of these approaches could potentially suffer from the fact that two different sensors are used to calculate position (neutral-point voltage and DC link voltage). If there are difficulties matching the performance of these two sensors (e.g. gain and offset) then errors could result. An alternative way to determine DC link voltage that can overcome this issue is to sample the neutral point voltage during the inverter state 7 (see FIG. 3) where all three phases are high and the neutral point voltage is equal to the DC link voltage. Thus the same sensor is used for all five measurements. This approach can also be potentially beneficial in high-voltage systems where saving one voltage transducer could reduce the cost of the system.

The advantages of measuring the neutral point using two pairs of inverter state measurements are that the first order harmonic can be cancelled out. The disadvantage is that the additional measurement states can limit the maximum voltage that can be applied.

Another disadvantage is that to compensate for the fact that no measurements are made for one of the three phases, the mean inductance at the point of measurement should be known. This can only be measured at the point where the two phases being measured change—at that point all three phases have just been measured. As the mean inductance is only updated periodically any change in the mean between updates will introduce an error into the position measurement.

Ideally measurement of the DC link voltage should remove this error by removing the DC link voltage component to leave just the harmonic component but due to measurement errors this may not be the case.

Sampling $u_n$ in Two Inverter States

Figure 5:
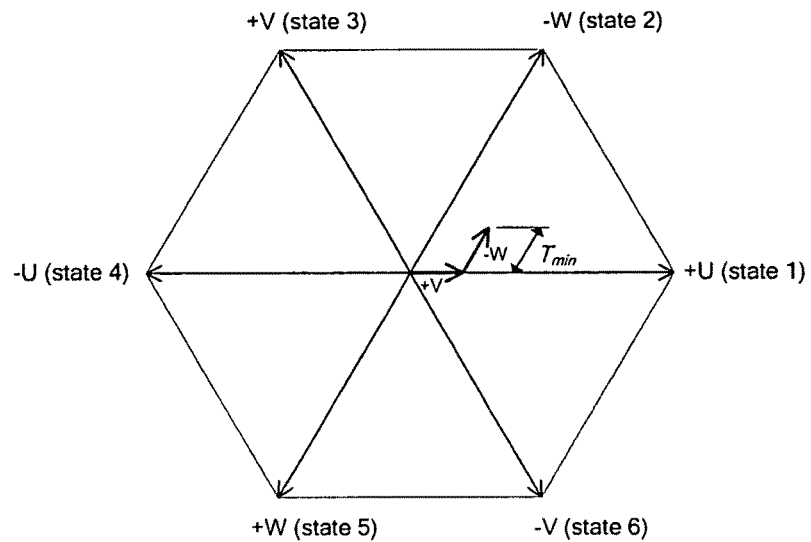
FIG. 5 is a space vector diagram for a PWM pattern containing two inverter states suitable for neutral-point sampling for low-speed sensorless control according to an embodiment of the invention.

Although ideally the neutral point voltage should be measured in two complementary pairs of inverter states, there are situations where it would be desirable to derive position from measurements carried out during just two non-complementary inverter states (for example state +U and −W) as shown in FIG. 5. One reason for doing this is to increase the maximum modulation index; another reason is to minimise or eliminate the change in to an existing modulation strategy such as centre-aligned PWM. Examples of these are discussed below.

When only two non-complementary inverter states are used, the ohmic and rotor back-EMF voltage contributions are no longer cancelled out. For example, the neutral point voltage in a low mutual-inductance PMSM during inverter state +U becomes (assuming the d axis current, $i_d$, is zero):

$$u_n(+U) \approx \frac{U_{DC}}{3}\left[1 - \frac{\tilde{L}}{L}\cos(2\theta)\right] - \frac{\tilde{L}}{L}\left[i_q R - \frac{k_e \omega_m}{\sqrt{3}}\right]\cos\left(3\theta + \frac{\pi}{2}\right) \quad (19)$$

Where $i_q$ is the q axis current, $k_e$ is the rotor back-EMF constant and $\omega_m$ is the rotor mechanical frequency.

The ohmic and back-EMF voltage drops introduce voltage distortion on the neutral-point voltage signal at a frequency three times the electrical frequency of the rotor. The extent of this distortion will depend on the machine design and operating conditions. For some applications (particularly high voltage applications where the effect of phase resistance can be neglected) the distortion effect will be small and may be ignored. In these circumstances the two neutral point voltages measurements approximate to:

$$u_n(+U) \approx \frac{U_{DC}}{3}\left[1 - \frac{\tilde{L}}{L}\cos(2\theta_e)\right] \quad (20a), (20b)$$

$$u_n(-W) \approx \frac{U_{DC}}{3}\left[2 + \frac{\tilde{L}}{L}\cos\left(2\theta_e - \frac{8\pi}{3}\right)\right]$$

And the position estimate, $\hat{\theta}$, may be calculated from:

$$u_{nU} = u_n(+U) - \frac{U_{DC}}{3} \quad (21a)\text{-}(21d)$$

$$u_{nW} = -u_n(-W) + \frac{2U_{DC}}{3}$$

$$u_{nV} = -u_{nU} - u_{nW}$$

$$2\hat{\theta} = -\arg\left\{u_{nU} + u_{nV}e^{j\frac{2\pi}{3}} + u_{nW}e^{j\frac{4\pi}{3}}\right\} + \pi$$

where 'arg' is the argument or angle of a complex number.

For other applications it may be necessary to compensate for the ohmic and back-EMF voltage drops. The ohmic voltage drop may be calculated using phase current measurements and knowledge of the phase resistance; the rotor back-EMF may be calculated using rotor speed and knowledge of the rotor back-EMF constant. These terms can then be used to compensate equation (19) to remove load- and speed-dependency. Alternatively feedforward compensation terms may be used to remove the unwanted harmonic components.

Note that the linear description of the ohmic and rotor back-EMF terms is a simplification and in reality a more complicated non-linear model may be required that accounts for effects such as inverter and magnetic non-linearities in order to achieve good compensation. Ideally, a single model would be sufficient to cover all of the part-to-part variations within a product. However, if necessary the model could be calibrated on each part at the end of the production line. Alternatively, a self-adaption algorithm could be used that learns and eliminates the ohmic and back-EMF terms on-line whilst the drive is operating. Such an algorithm would take advantage of the fact that the ohmic and back-EMF voltage terms in the neutral-point voltage vary at three times the electrical frequency, and would use techniques such as synchronous rectification and filtering to isolate the undesired components and eliminate them.

PWM Pattern Realisation for Two Inverter States—Shifting PWMs

In order to guarantee that the two required inverter states are always present it is possible to shift the PWM signals in the same way as described above. However, because only two inverter states are required a higher maximum modulation index may be achieved.

Although any two inverter states from different phases could be used, the optimal solution is to use the two inverter states adjacent to the SVM sector where the voltage demand lies as shown in FIG. 5. In which case the maximum achievable modulation index demand becomes:

$$M_{max} = \frac{4}{3}\left(1 - \frac{T_{min}}{T_{PWM}}\right) \quad (22)$$

Thus very high modulation indices are possible with this technique.

This PWM shifting technique is the same as is used to measure the stator currents in many single current sensor techniques. This makes this technique particularly well suited to single current sensor systems as no further modifications are required to the PWM algorithm. However, it should be noted that this technique is equally applicable to systems with multiple phase current sensors.

PWM Pattern Realisation for Two Inverter States—Centre- or Edge-Aligned PWMs

Figure 6:
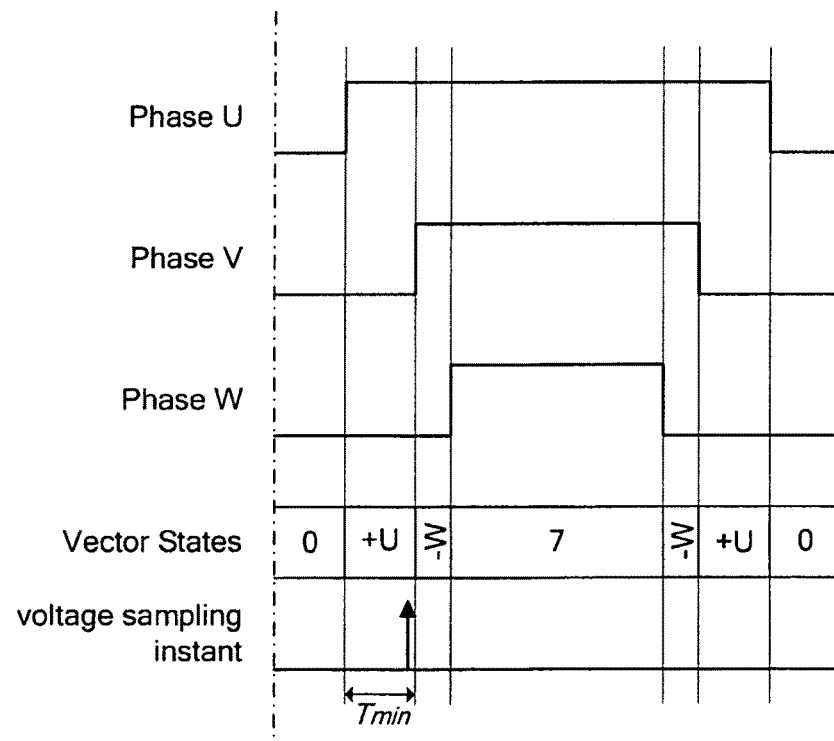
FIG. 6 is a diagram of a PWM pattern containing only one inverter state suitable for measuring neutral point voltage with centre-aligned PWM.
Figure 7:
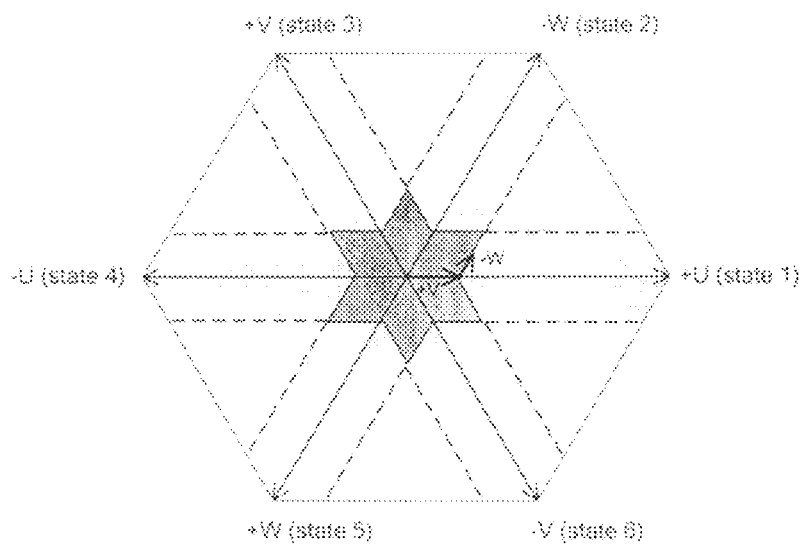
FIG. 7 is a space vector diagram showing where the conditions shown in the example of FIG. 6 apply.

Although it is preferable to shift the PWM patterns as described above, it is possible to achieve two non-zero inverter states using conventional PWM patterns (e.g. centre-aligned or edge-aligned) without any further modification since these patterns will contain the two required states under many conditions. However, an example is shown in Figure of a net voltage where it is not possible to produce two active states of sufficient length. In the example shown the −W state is too short to enable the neutral-point voltage to be sampled. FIG. 7 shows the parts of the vector space where, as with the net voltage required in FIG. 6, it is not possible to produce two inverter states of sufficient length. The light shaded bands between the broken lines are the regions where there exists only one non-zero inverter state of sufficient length for sampling; the dark shaded central star shaped area is the region where there are no non-zero inverter state of sufficient length for sampling.

One of the ways that this problem is overcome in certain di/dt sensorless schemes, and which can also be used in embodiments of this invention, is to modify the PWM patterns over two consecutive PWM periods. In one of those periods the duty cycle demands are modified so that there is sufficient time to measure the neutral point voltage in both inverter states; in the other period the duty cycle demands are modified by an equal and opposite amount so that the total voltage demand over the two PWM cycles is equal to the original demand. The problem with this technique is that it will introduce high-frequency phase current components that are sub-harmonics of the PWM frequency, which is likely to lead to acoustic noise. However, if the time required to sample the neutral-point voltage, $T_{min}$ is sufficiently small, the magnitude of the acoustic noise may be negligible. Again this is an advantage of the neutral-point technique over di/dt techniques since it will generally be the case that the time required for the neutral-point measurement to settle will be less than the equivalent di/dt measurement.

An alternative solution for the regions where only one non-zero inverter state of sufficient length can be realised is to track the position information from just one inverter state. Although a unique position cannot be determined from a single state, it is possible to estimate or track the position based on knowledge of the last known position where two inverter states were measurable and the change in the voltage for the one measurable state. However, this technique would not work at very low modulation index demands where there are no non-zero inverter states of sufficient length to measure the neutral point voltage (see Figure). In this situation an alternative technique would be required.

If edge-aligned modulation is used instead of centre-aligned modulation, the size of the operating region that cannot realise two inverter states of sufficient length is halved. In this case the magnitude of the effects described above is also halved which gives edge-aligned modulation an advantage over centre-aligned modulation in this instance.

It will be appreciated that by reducing the number of measurements to only two inverter states the maximum voltage can be realised is increased, but without the removal of the resistance term additional compensation is required.

By measuring the inverter in two states the sensorless algorithm can operate across the full speed/load range of the motor and therefore a single sensorless algorithm can be used. Traditionally two algorithms are required—a low speed technique (which is where this algorithm is intended to operate) and a high speed technique which uses the back EMF to determine electrical position. This embodiment can remove the need for a separate high speed technique.

As with the embodiment using four inverter state measurement knowledge of the correct mean inductance is important and any error in this will result in position error.

Sampling $u_n$ in Six Inverter States

It is possible to create PWM waveforms with six non-zero inverter states.

With neutral-point voltage measurements in all six non-zero voltage states the position is defined by equations (16a), (16b) and (16c):

$$u_n(+U) - u_n(-U) \approx \frac{U_{DC}}{3}\left[-1 - \frac{2\tilde{L}}{L}\cos(2\theta_e)\right] \quad (16a), (16b), (16c)$$

$$u_n(+V) - u_n(-V) \approx \frac{U_{DC}}{3}\left[-1 - \frac{2\tilde{L}}{L}\cos\left(2\theta_e - \frac{4\pi}{3}\right)\right]$$

$$u_n(+W) - u_n(-W) \approx \frac{U_{DC}}{3}\left[-1 - \frac{2\tilde{L}}{L}\cos\left(2\theta_e - \frac{8\pi}{3}\right)\right]$$

This makes it possible to determine position solely from the neutral point voltage signals without needing to measure the DC link voltage. This means that only one voltage sensor is needed to determine motor position. This could be important if the variation in performance between the DC link voltage sensor and the neutral-point voltage sensor are sufficiently high to cause problems with the position estimate. It also reduces the required number and accuracy of the voltage sensors which could help to reduce the cost and complexity of the final system.

Another advantage of only requiring a single voltage sensor is that this provides redundancy. If the motor position can be entirely determined using neutral point voltage measurements, then the DC link voltage measurement could be used as a diagnostic cross check. If the controller determines that the DC link voltage measurement does not agree with the neutral point voltage measurements in equations (16a)-(16c) sufficiently to meet a consistency condition which is defined within the controller, then the controller can be arranged to generate an output indicating that there must be a fault in the system.

Sampling $u_n$ in Three Inverter States

Figure 8:
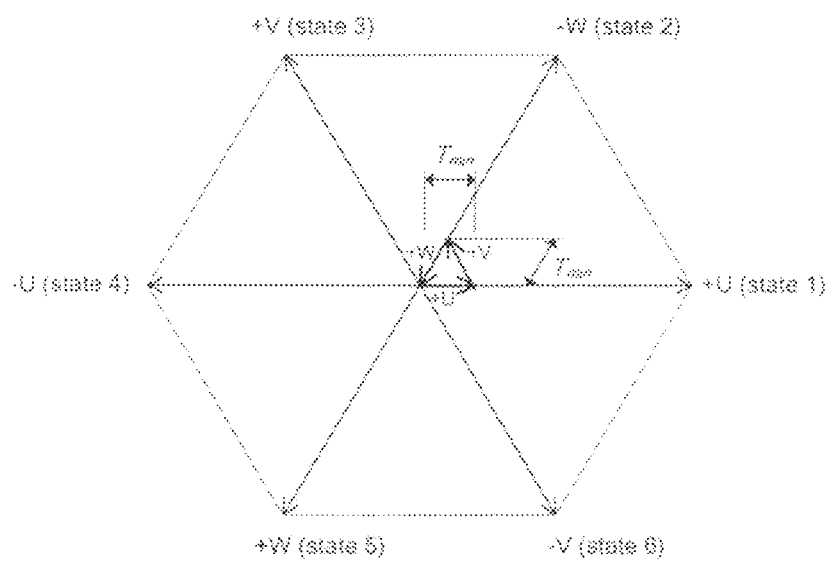
FIG. 8 is a space vector diagram for a further PWM pattern containing inverter states suitable for neutral-point sampling according to another embodiment of the invention.

The main disadvantage with measuring six inverter states is that it gives the smallest available modulation index. This can be avoided by taking measurements in only three non-zero inverter states, one from each phase, for example using the combination of states shown in FIG. 8. The inverter states may be all positive, all negative or a combination of both. As with six inverter states, taking measurements in only three inverter states makes it possible to determine motor position without measuring the DC link voltage. However, it increases the available modulation index for creating motor torque.

The neutral point voltage (for the +U inverter state) is defined by equation (19), which assuming zero speed/zero current conditions allows the three positive vector states +UVW to be defined by:

$$u_n(+U) \approx \frac{U_{DC}}{3}\left[1 - \frac{\tilde{L}}{L}\cos(2\theta_e)\right] \quad (23a, 23b, 23c)$$

$$u_n(+V) \approx \frac{U_{DC}}{3}\left[1 - \frac{\tilde{L}}{L}\cos\left(2\theta_e - \frac{4\pi}{3}\right)\right]$$

$$u_n(+W) \approx \frac{U_{DC}}{3}\left[1 - \frac{\tilde{L}}{L}\cos\left(2\theta_e - \frac{4\pi}{3}\right)\right]$$

Measuring the neutral point in three inverter states (one from each pair of complementary states) is advantageous as, for a motor with balanced phase resistances, there are no first order harmonics to cancel out (unlike the di/dt technique). Also, since it is a three phase system, the DC component and 3rd order harmonics are naturally removed. This means that the three inverter state technique is not affected by changes in the back EMF, and therefore it is speed independent.

This allows the position to be calculated directly from the three neutral point voltage measurements using:

$$2\hat{\theta} = -\arg\left\{u_{nU} + u_{nV}e^{j\frac{2\pi}{3}} + u_{nW}e^{j\frac{4\pi}{3}}\right\} + \pi \quad (24)$$

In reality there may be a requirement to improve the position by removing the 1st and 4th order terms as, as the current increases and the inductance saturates, the harmonic content of the motor will change.

Figure 9:
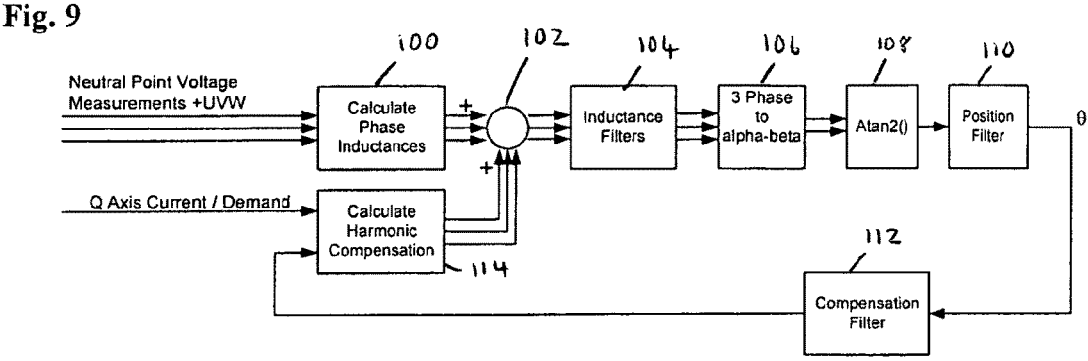
FIG. 9 is a functional diagram of a control system according to an embodiment of the invention arranged to use the PWM pattern of FIG. 8.

An example of a control system using a sensorless position algorithm incorporating feedforward compensation as described above is shown in FIG. 9. A phase inductance module 100 is arranged to receive as inputs the neutral point voltage measurements for the three active states, and the neutral point voltage as measured or calculated. This module 100 outputs the three phase inductances in the UVW frame, to which the compensation terms are applied, in the UVW frame, by a compensation module 102. An inductance filter block 104 filters the inductance values and inputs them to a transformation block 106 which transforms the inductances to the alpha-beta frame. From the outputs of the transformation block, A tan 2θ is calculated, from which the position θ is calculated and then filtered by a position filter block 110. The position θ is fed back via a compensation filter block 112 to a harmonic compensation calculation block 114 which also receives as an input the Q axis current demand and calculates appropriate harmonic compensation terms for compensating the initially calculated phase inductances as described above.

It will be appreciated that while this system is described in terms of functional blocks which can correspond to separate processing steps, the processing which performs the functional steps may be combined together and can be performed in software or hardware.

As the transformation from UVW to alpha-beta frame does not require the position the compensation could also be applied in the alpha-beta frame. Similarly while the position is shown as computed from arc-tangent; a PLL can be used just as easily.

Figure 10:
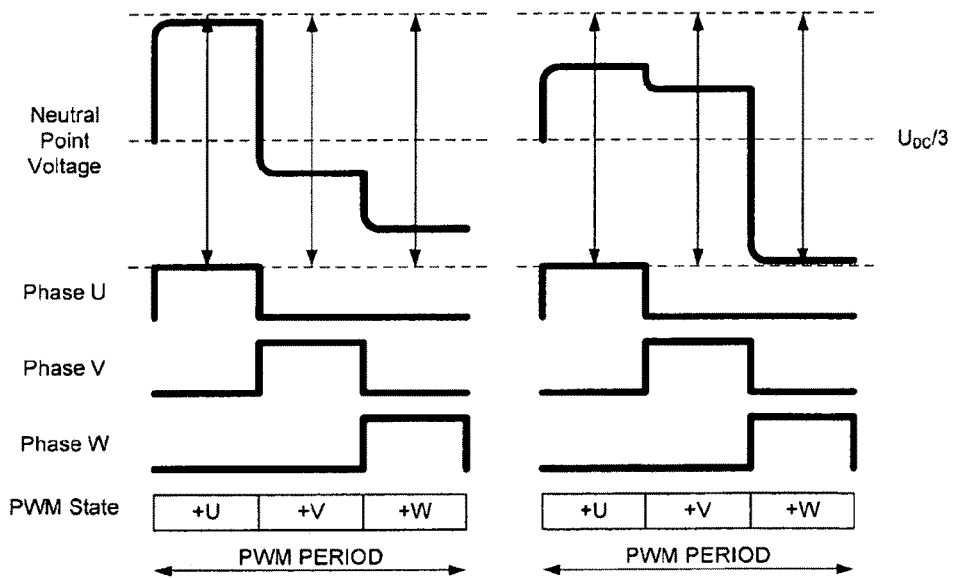
FIG. 10 is a graph showing how the neutral point voltage in the system of FIG. 2 varies with PWM state and motor position.

FIG. 10 shows how the neutral point voltage, as measured during the three active states described above with reference to FIG. 8, varies between different electrical positions of the motor. The left and right sides of the figure correspond to two different positions. The bottom half of each side shows the phase terminal voltages during one PWM period, and the top half shows the neutral point voltage and how it varies over the PWM period and between the three active states. It can be seen that in this case in all three states the neutral point voltage is significantly different for the two positions, indicating that the method of this embodiment can successfully be used to determine motor position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A control system for an AC electric motor which comprises a rotor and a stator and a plurality of phase windings connected in a star formation, each winding having one end connected to a common neutral point and another end arranged to have a terminal voltage applied to it, the control system comprising:
   at least one switch arranged to control the terminal voltages applied to the windings; and
   a controller operative to control the at least one switch so as to switch the at least one switch between a plurality of states in each of a sequence of PWM periods with the controller further operative to measure a neutral point voltage at the neutral point at each of a plurality of sample times and to generate an estimation of the rotational position of the rotor from the measured voltages.

2. The system according to claim 1 wherein the controller is operative to measure a DC link voltage that is applied to the system and further wherein the controller is operative to use the DC link voltage measurement to generate the position estimation.

3. The system according to claim 1 wherein the controller is operative to measure the neutral point voltage when all of the phases are connected to a DC link voltage that is applied to the control system and further wherein the controller is operative to generate an estimation of the DC link voltage from the measured neutral point voltage and to use the DC link voltage estimation to generate the position estimation.

4. The system according to claim 2 wherein the controller is operative to measure the neutral point voltage when all of the phases are connected to the DC link voltage and to use the measured neutral point voltage to generate an estimation of the DC link voltage and further wherein the controller is operative to compare the measured DC link voltage with the estimated DC link voltage and to generate a fault indication if the measured and estimated DC link voltages fail to meet a consistency condition.

5. The system according to claim 1 wherein the sample times are within the PWM periods.

6. The system according to claim 1 wherein the controller is arranged to measure the neutral point voltage during two complementary states within one PWM period.

7. The system according to claim 6 wherein the controller is arranged to measure the neutral point voltage during two pairs of two complementary states within one PWM period.

8. The system according to claim 1 wherein the controller is arranged to measure the neutral point voltage during each of a number of non-complementary states equal to the number of phases of the motor, within one PWM period.

9. The system according to claim 1 wherein the controller is operative to define a minimum state time for neutral point voltage measurement and a minimum number of active states within a PWM period in which the neutral point voltage needs to be measured, to determine a demanded net voltage for the PWM period and further wherein the controller is operative to control the at least one switch so as to provide at least the minimum number of active states, each for at least the minimum state time, and to provide the demanded net voltage.

10. A method of determining the rotational position of an AC machine having a plurality of windings each connected at one end to a neutral point and at the other end to at least one switch, the switches forming a switching system and being switchable to switch the switching system between a plurality of states in each of a sequence of PWM periods to thereby to control voltages applied to the windings, the method comprising the steps of:
   (a) measuring a neutral point voltage at the neutral point in at least two states of the switching system; and
   (b) estimating motor position from the measured neutral point voltages.

11. A control system for an AC electric motor which comprises a rotor and a stator and a plurality of phase windings connected in a star formation, each winding having one end connected to a common neutral point and another end arranged to have a terminal voltage applied to it, the control system comprising:
   at least one switch arranged to control the terminal voltages applied to the windings; and
   a controller operative to control the at least one switch so as to switch the at least one switch between a plurality of states in each of a sequence of PWM periods, the controller being further operative to measure a neutral point voltage at the neutral point when all of the phases are connected to a DC link voltage that is applied to the control system and to generate an estimation of the DC link voltage from the measured neutral point voltage.

12. The control system according to claim 11 wherein the controller is further operative to compare a measured DC link voltage with the estimated DC link voltage and if the measured and estimated DC link voltages fail to meet a consistency condition, to generate a fault indication.

* * * * *